(12) United States Patent
Collins et al.

(10) Patent No.: US 7,841,170 B2
(45) Date of Patent: Nov. 30, 2010

(54) REGENERATION OF DIESEL PARTICULATE FILTERS

(75) Inventors: Thomas Adam Collins, Horseheads, NY (US); Achim Karl-Erich Heibel, Corning, NY (US); Robert John Locker, Corning, NY (US)

(73) Assignee: Corning Incorporated, Corning, NY (US)

( * ) Notice: Subject to any disclaimer, the term of this patent is extended or adjusted under 35 U.S.C. 154(b) by 166 days.

(21) Appl. No.: 12/084,177

(22) PCT Filed: Oct. 24, 2006

(86) PCT No.: PCT/US2006/041422
§ 371 (c)(1),
(2), (4) Date: Apr. 25, 2008

(87) PCT Pub. No.: WO2007/053367
PCT Pub. Date: May 10, 2007

(65) Prior Publication Data
US 2009/0241513 A1     Oct. 1, 2009

Related U.S. Application Data

(60) Provisional application No. 60/731,117, filed on Oct. 28, 2005, provisional application No. 60/731,116, filed on Oct. 28, 2005.

(51) Int. Cl.
*F01N 3/00*     (2006.01)
(52) U.S. Cl. .............................. 60/295; 60/274; 60/297; 60/311

(58) Field of Classification Search ................... 60/276, 60/277, 295, 297, 311, 274
See application file for complete search history.

(56) References Cited

U.S. PATENT DOCUMENTS

| 5,551,971 | A  | 9/1996  | Chadderton et al. ............. 95/15 |
| 5,853,459 | A  | 12/1998 | Kuwamoto et al. ........... 95/273 |
| 6,574,956 | B1 | 6/2003  | Moraal et al. ................. 60/295 |
| 6,829,890 | B2 | 12/2004 | Gui et al. ...................... 60/295 |
| 6,843,055 | B2 | 1/2005  | Ootake ........................ 60/297 |
| 6,862,927 | B2 | 3/2005  | Craig et al. ................ 73/118.1 |
| 6,941,750 | B2 | 9/2005  | Boretto et al. ................ 60/297 |
| 7,169,364 | B2 | 1/2007  | Ohtake et al. ................ 422/168 |
| 7,174,708 | B2 | 2/2007  | Bardon et al. ................. 60/303 |
| 2002/0104312 | A1 | 8/2002 | Hoffman et al. .............. 60/286 |
| 2005/0022505 | A1 | 2/2005 | Kitahara ....................... 60/274 |
| 2005/0137776 | A1 | 6/2005 | Gioannini et al. ........... 701/101 |

OTHER PUBLICATIONS

SAE Technical Papers, Document No. 2004-01-2657, Cutler, W, Floerchinger, P, et al., *Dpf Regeneration—Concept to Avoid Uncontrolled Regeneration During Idle*, presented at SAE Commercial Vehicle Engineering Congress & Exhibition, Oct. 2004, Rosemont, IL, USA, Session: Emissions Aftertreatment: Particulate Control.

*Primary Examiner*—Thomas E Denion
*Assistant Examiner*—Diem Tran
(74) *Attorney, Agent, or Firm*—Matthew B. McNutt

(57) ABSTRACT

Porous ceramic diesel particulate filters are regenerated to combust accumulated carbon particulates trapped therein through a controlled regeneration process wherein heat is input to the filter at a ramped or staged heating rate below that rate at which the particulate combustion process would proceed so rapidly and extensively that filter temperatures would be raised to filter-damaging levels.

5 Claims, 4 Drawing Sheets

REGENERATION OF DIESEL PARTICULATE FILTERS

This application claims the benefit of U.S. Provisional Application No. 60/731,116, filed Oct. 28, 2005, entitled "Staged Regeneration of Diesel Particulate Filters.

This application also claims the benefit of U.S. Provisional Application No. 60/731,117, filed Oct. 28, 2005, entitled "Minimizing Exotherms in DPF Regeneration".

BACKGROUND OF THE INVENTION

New legislation to control the emissions from diesel engines is being developed or put in place worldwide. As a consequence, increased efforts are underway by diesel engine designers and heavy equipment manufacturers to develop better engine control and exhaust treatment technologies. Such efforts include programs to develop diesel particulate filter (DPF) technology for trapping the particulates (e.g. soot) that are present in the exhaust streams of all diesel engines. Thus current and future legislative requirements are trending toward the adoption of particulate filtration technology to effect the removal of at least some carbonaceous particulates (e.g. soot) from the exhaust streams of diesel powered vehicles. The ceramic diesel particulate filter (DPF), which is the technology of choice for this task, filters soot out of the exhaust stream through wall-flow filtration.

A shared characteristic of current DPFs is that they accumulate soot and other particulates continuously over accumulated periods of engine operation. Continuous oxidation of the soot is intended, but not feasible over the entire engine operating range even for filter designs incorporating catalyst coatings (referred to as "catalyzed" as opposed to "uncatalyzed" filters). Therefore a necessary aspect of the use of DPF systems for diesel emissions control is that the filters must be periodically cleaned or "regenerated" once the accumulation of trapped particulates begins to adversely affect engine operation.

To effect these periodic active regenerations, the inlet temperature to the DPF is raised, typically by heating the exhaust gas entering the filter to a temperature greater than 600° C. to allow the accumulated soot to ignite and burn off. Exhaust gas heating may be accomplished, for example by the combustion of additional fuel with or without the support of an oxidation catalyst.

Within the diesel industry, filter regeneration has been recognized as problematic. The inlet conditions to the filter (exhaust gas temperature and flow, exhaust composition), as well as the soot load level of the filter, have a significant impact on the regeneration behavior of the DPF. In many cases, the soot ignition can create extreme exotherms within the filter, leading to filter cracking and/or melting and loss of filtration effectiveness. Thus significant attention has been devoted to the development of new technologies for reducing the risk of filter damage, including ways to moderate the very high filter temperatures affiliated with uncontrolled regenerations, i.e., regenerations characterized by the rapid and uncontrolled combustion of the accumulated soot.

At the same time it is desirable to complete the regeneration process quickly to reduce the fuel economy penalty and to enable nearly complete regeneration, especially under dynamic driving conditions. Quick regeneration also lowers the probability of encountering the undesired boundary condition referred to as Drop-to-Idle (DTI), during which the idling engine produces exhaust gas flows that are inadequate to effectively moderate peak filter temperatures during the soot combustion process.

Rapid regeneration can be achieved by ramping quickly to high inlet temperatures that exceed soot combustion temperatures (typically 650-750° C.). These high inlet temperatures typically cause the combustion process to progress very rapidly from the inlet of the DPF toward the filter outlet, creating the potential for excessively high temperatures near the exit face of the DPF which can damage the filter. In addition, fast heat-up regeneration can produce non-uniform and incomplete soot combustion wherein the center of the filter is regenerated but the periphery retains some level of unburned soot. This makes it difficult for engine control systems to predict what the actual filter soot loading level is and when to initiate the next filter regeneration cycle.

One strategy used to combat the potential for product failure under these circumstances is to reduce the maximum allowable soot loading level within the DPF, thereby increasing the regeneration frequency. This strategy, unfortunately, carries regeneration uniformity, regeneration efficiency, and fuel efficiency penalties, and can additionally cause high engine oil dilution levels from the excessive use of in-cylinder fuel post-injection to initiate regeneration. The latter effect reduces oil lubricity and has a negative effect on engine emissions and engine lifetime.

Engine dynamometer studies have been conducted throughout the industry under various engine operating conditions that can closely simulate the conditions encountered in actual vehicle operation under various road and off-road environments. In the course of such studies various systems for initiating soot combustion at the start of the regeneration cycle have been evaluated, including the post injection of fuel, the use of an oxidation catalyst, the use of burner fired by supplemental fuels, and the use of in-line exhaust gas heaters placed upstream of the particulate filter. All can effectively initiate filter regeneration, but none has so far been shown to be effective in managing the regeneration process after soot combustion has been initiated.

U.S. Pat. No. 5,551,971, for example, discloses a system wherein thermocouples for monitoring filter temperatures during regeneration are connected to an electronic control unit which can reduce the amount of heat energy input to the filter if filter temperatures exceed certain set points. One drawback of this approach is the need to provide thermocouples and associated circuitry directly within the exhaust system and the filter itself. Another problem is that excessive filter temperatures are known to develop from uncontrolled soot combustion within the filter whether or not the supply of supplemental heat energy to initiate that combustion is interrupted.

SUMMARY OF THE INVENTION

The present invention provides DPF regeneration strategies that involve adjusting the heat-up rate of the heated exhaust gas being supplied to the filter to initiate combustion in a way that effectively controls the subsequent combustion process. These strategies are adaptable to any of a variety of filter materials, filter geometries and loadings of combustible particulate present in the filters at the time of regeneration, being applicable both to catalyzed and uncatalyzed diesel particulate filters as well as to filters composed of lower thermal conductivity ceramics such as cordierite and/or aluminum titanate.

A useful characterization of the filter regeneration process is that, as heat is input to the filter to initiate soot combustion and some of the soot begins to burn, the resulting combustion reaction produces more heat that triggers a chain reaction of soot combustion within the filter. In this respect the regeneration process can be considered as one having "thermal momentum". The initial combustion creates a set amount of heat, or a specific initial temperature. Then, as the reaction progresses through the remainder of the soot, more heat from the combustion of the remaining soot creates an additional increase in temperature within a small amount of time. The result of this combustion is a fast temperature increase within the DPF. Further, if larger amounts of heat are added in smaller amounts of time, larger amounts of soot ignite simultaneously.

According to this view, the kinetics of soot combustion will be affected by the heating ramp rate insofar as that rate determines the size of the initial volume of soot combusted. The initial combustion volume and its resultant heat of combustion then give rise to combustion deeper within the filter. If the initial volume is heated quickly, a larger portion of the soot in that area will more immediately burn, leading to higher downstream temperatures that make the combustion kinetics in the subsequent downstream filter volume more extreme, and so on down the length of the filter. Thus a fast ramp or filter heat-up rate imparts combustion momentum which carries the overall exotherm to extreme conditions.

With more modest ramp rates, the heat-up is designed to occur more slowly so that only small portions of the accumulated soot start burning and only a small amount of combustion heat is generated. The normal exhaust gas flow through the filter can then adequately dilute this generated heat and dissipate it without leading to extreme temperatures. A combustion chain reaction still occurs, but since a lower temperature is created initially and the rate of heat addition is lower, soot combustion occurs over a longer time interval and the peak of the combustion exotherm, and thereby the peak filter regeneration temperature, are significantly reduced.

In one aspect, therefore, the invention includes a method for regenerating a diesel particulate filter to remove a quantity of collected combustible particulate material (e.g., soot alone or with other incompletely combusted exhaust condensates) from the filter. As is conventional, such regeneration comprises the step of introducing heat into the filter, by any of various suitable means, to raise the temperature of the material to a material ignition temperature. In accordance with the invention, however, that ignition or light-off heat is introduced into the filter at a heating ramp rate below a filter-damaging threshold heating rate. The threshold heating ramp rate is the rate at which extensive simultaneous soot ignition can occur to an extent effective to generate excessive peak filter regeneration temperatures, i.e., temperatures equal to or even exceeding the melting point of the filter.

In certain further embodiments the invention involves the staging of the elevated exhaust inlet temperatures required to initiate regeneration to maintain the rate of temperature increase at levels at or near but not exceeding the maximum safe rate possible. This minimizes the risk of DPF failure due to high peak temperatures and temperature gradients, even if undesirable conditions such as DTI conditions are encountered during the regeneration cycle.

Staged methods for regenerating porous ceramic particulate filters containing trapped combustible particulates in accordance with the invention will comprise a first or initial stage during which the temperature of the filter, or at least of the soot and other combustible particulates contained within the filter, is raised only to an initial regeneration temperature range. That initial range is temperature-limited, that is, it is bounded by an upper temperature limit that is high enough to initiate the combustion of trapped particulates, but is insufficient either to complete soot combustion, or to initiate soot combustion that is so widespread within the filter as to result in filter damage from soot combustion exotherms.

Thereafter, a second stage of regeneration involving further heat input to the filter is initiated. That stage involves adding additional heat energy to the filter, generally while the combustion from the first regeneration stage is still proceeding, the additional heat energy being sufficient to raise the temperature of the filter above the upper temperature limit of the first stage. That additional heat energy will promote the further combustion of trapped particulates in the filter, and if sufficient in quantity or duration, to substantially complete the combustion of all remaining trapped particulate and thereby achieve complete filter regeneration.

The upper temperature limit for first stage regeneration that may be selected for any selected filter or filtration system composition and design will vary depending upon the chemical composition of the filter, the amount and nature of the combustible particulate trapped in the filter at the start of regeneration, and other known variables relating to the operating envelope of the filter. However, one useful upper temperature limit that can easily and effectively be employed is that temperature at which soot combustion can be initiated, but cannot be completed without the introduction into the filter of additional heat energy. Another useful limit is that temperature at or below which the soot combustion exotherms arising from the initiation of trapped particulate combustion are insufficient to raise the temperature of the filter above a filter thermal cracking or melting temperature.

As will be evident from the foregoing description, the threshold heating ramp rate or staged heating temperatures for any particular system will be largely dependent on the material from which the filter is constructed, the geometrical design of the filter, and the amount of combustible particulate present in the filter to be removed. However, those rates and temperatures can be routinely determined for any filter design and soot-loaded condition simply by conducting regenerations over a range of heating ramp rates or staging temperatures and determining the peak filter temperatures observed at those radial and axial positions within the filter where high temperatures are typically developed during regeneration.

The regeneration processes of the invention result in a more predictable and uniform soot burnout, equivalent or higher regeneration efficiencies, and lower fuel consumption than traditional strategies, and they can be applied to filters made from any of the known DPF materials presently being considered for these applications.

DESCRIPTION OF THE DRAWINGS

The invention may be further understood by reference to the appended drawings, wherein.

DETAILED DESCRIPTION

Figure 1:
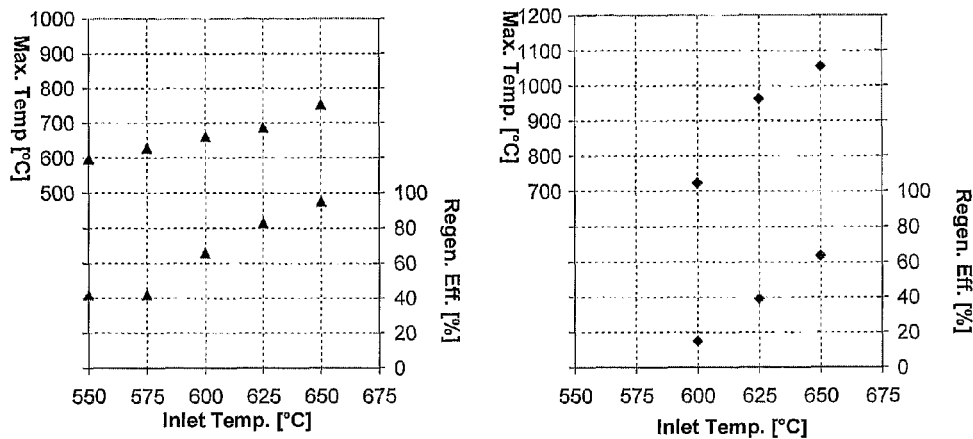
FIG. 1 is a graph plotting regeneration temperatures and efficiencies for two regeneration cycles.

An important advantage of the invention is that various highly efficient filter construction materials, including porous cordierite ceramics, that are less refractory than non-oxide filter materials and which have heretofore been considered to present a somewhat higher risk of regeneration damage at high soot loadings, can be more widely and economically employed if heating ramp rates in accordance with the invention are used for filter regeneration. Another advantage is that, regardless of the filter construction material employed, the intervals between filter regenerations, (which regenerations typically impose measurable fuel consumption penalties) can be increased. This is because regenerations at higher filter loadings of combustible particulates can be successfully managed.

Filter performance maps to control DPF regeneration cycles for any particular filter design and construction as well as for any engine and designed regeneration initiation system can be developed utilizing conventional engine-dynamometer testing methods as above described. Alternatively, on-road vehicles can also be used to develop such temperature distribution information. Again, filter regeneration cycles for a particular system and filter are initiated within a range of filter heat-up rates and soot loadings for a particular engine and combustion initiation system to determine the maximum soot load and heat-up rate at which a filter can be heated without reaching any particular filter damage threshold temperature that may be set by an exhaust system designer. The highest threshold temperature is generally the melting temperature of the filter construction material. However, developing performance maps to avoid less severe types of filter or exhaust system damage, such as filter cracking, that might occur at lower threshold temperatures, is also routine.

Control of the regeneration heating ramp rate can be assigned to an ECU operating as part of the engine control system. The heat to be added to initiate soot combustion, whether by fuel post-injection or other active means, may be controlled according to the length of time elapsing between regeneration cycles, or according to the mass of accumulated particulate on the filter as detected, for example, by exhaust system pressure sensors. Slower ramp rates may then be used for larger complements of accumulated soot as necessary to control soot combustion rates.

One additional consideration to be addressed in the practice of the present invention is the percentage of regeneration or extent of particulate removal that will occur during any particular regeneration cycle. Limiting the regeneration cycle to a maximum exotherm can result in less than 100% regeneration, i.e., less than full removal of accumulated particulate.

This problem can be successfully addressed by conducting the regeneration in two portions or phases. Where a DPF is heavily loaded with particulates such that only low heating ramp rates can be used, then first stage regenerations that are only 50-60% complete may result. To complete filter regeneration, then, a second regeneration phase can be initiated at a fast heating ramp rate, burning off the rest of the accumulated soot and thereby completing the regeneration cycle. The overall result is 100% regeneration with effective minimization of regeneration exotherm temperatures.

Figure 8:
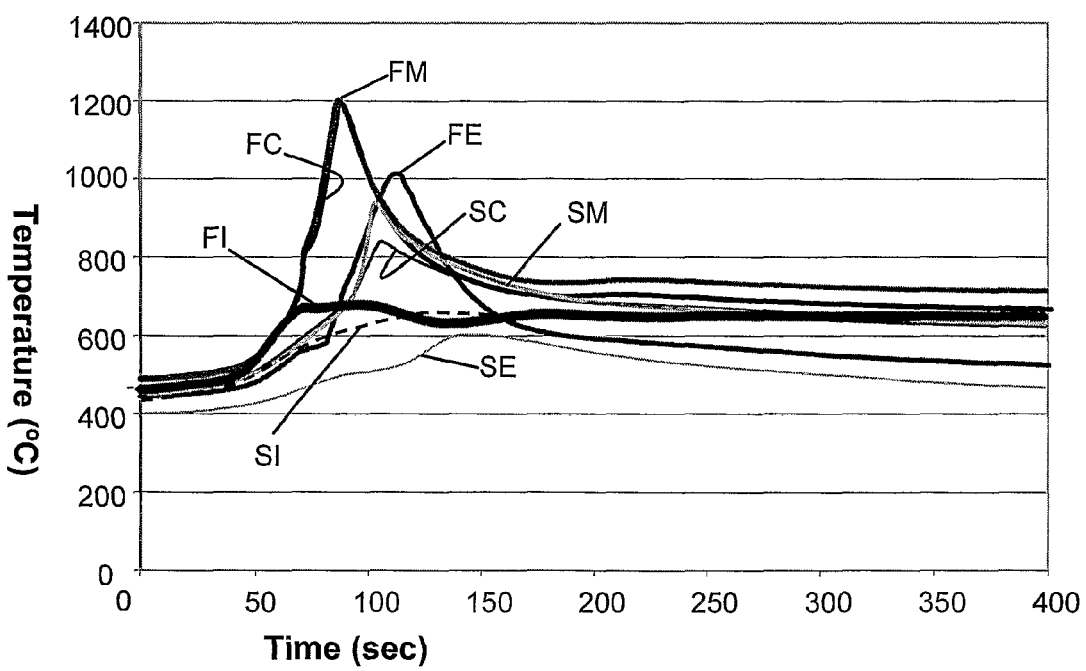
FIG. 8 is a plot of the peak filter temperatures observed during regenerations of diesel particulate filters conducted at differing heating ramp rates.

The effectiveness of regeneration heating ramp rates to control particulate combustion and thus the peak temperatures observed in DPFs throughout the ensuing regeneration cycles is shown for one particular engine-filter combination in FIG. 8 of the appended drawings. FIG. 8 is a graph plotting the temperatures observed during DPF regeneration cycles initiated at two different heating ramp rates, as those temperatures are measured at four spaced locations within an instrumented soot-loaded diesel particulate filter over the same intervals of time. Temperature measurements are by means of thermocouples positioned centrally of the filter inlet face (i) and on the filter longitudinal center axis (C), mid-radius (M), and circumferential edge (E) spaced from the outlet face of the filter. The regeneration cycles conducted are carried out at substantially the same particulate loadings and at the same exhaust gas flow rates, the exhaust gases being those generated by a 5.9 L diesel engine running at 800 rpm throughout each of the regeneration cycles.

The method utilized to initiate soot combustion at the start of these regeneration cycles is a preheating of the engine exhaust gases upstream of the DPF inlet, in this case by means of an electric heater, although the means of heating the exhaust gases or the filter itself are not critical. The resulting temperatures as measured at the filter inlet faces are plotted in the drawing as Fast (FI) and Slow (SI) Inlet temperatures, respectively.

For both of the heating ramp rates evaluated during these tests the target filter inlet temperature is 650° C. However, for the conventional (Fast) regeneration run the heating ramp rate employed is sufficiently high to raise the filter inlet temperature from ambient exhaust gas temperatures to the target inlet temperature within 50-75 seconds (the FI temperature profile). In contrast, for the controlled (Slow) regeneration run, the heating ramp rate employed is such that filter inlet temperatures are raised from exhaust ambient to the target inlet temperature over a 100-150 second interval (the SI temperature profile).

One effect of the change in heating ramp rates is a change in the temperature at which the initiation of soot combustion causes one or more of the observed Center (C), Mid (M), or Edge (E) filter temperatures to rise more rapidly than the filter inlet temperature. For the Fast Inlet case, filter temperatures as measured at the Center (FC) and Mid (FM) locations break away from and exceed the Fast Inlet (FI) temperature profile at temperatures in excess of 650° C. For the slow heat-up condition (SI), breakaway occurs below 600° C.

The effects of slower heating ramp rates on peak filter regeneration temperatures are also evident from FIG. 8. As expected, the peak regeneration temperatures developed for either ramp rate profile vary as a function of thermocouple location within the filters. Filter Center (C) and Mid (M) position thermocouples normally measure significantly higher temperatures than the Edge (E) position thermocouples for almost all regeneration conditions. For this reason it is generally accepted that control of center and mid-radius filter temperatures is the primary requisite for successfully avoiding thermal filter damage.

In the case of the two different heating ramp rate conditions shown in the drawing, the Fast Inlet (FI) heating profile causes peak temperatures approaching 1200° C. to be reached in center and mid-sections of the filter (the FC and FM temperature profiles), these temperatures being sufficient in many cases to cause structural cracking and/or melting in filters of conventional geometry formed of porous cordierite ceramics. This is in marked contrast to the Slow center and mid-radius (SC and SM) temperature plots resulting from the use of the Slow Inlet (SI) heating ramp rate. In the latter case, the measured peak SM filter temperature; which is the highest temperature recorded for the SI regeneration condition, is nearly 270° C. lower than the 1200° C. temperatures developed using the Fast Inlet heating ramp rate.

From the data presented in the drawing it may be concluded that the use of heating ramp rates effective to maintain the average temperature rise rate at the filter inlet face to below 100° C./minute will be effect to provide effective protection against filter regeneration damage. Thus regeneration initiated at that heating rate enables temperatures within the filter to be confined to peak values below 1000° C. for the particular engine operation and particulate loading condition evaluated, the latter temperature representing a conservative regeneration temperature limit for most DPFs of cordierite composition and standard geometry.

The data presented also suggests that Slow Edge regeneration temperatures developed with the Slow Inlet heating profile are relatively low, only slightly exceeding 600° C. That profile gives rise to the possibility of incomplete particulate removal from edge sections of the filter under low ramp rate conditions. As noted above, in that case a second regeneration phase can be conducted wherein a fast heating ramp rate can be safely used to remove residual particulate material. The use of a heating ramp rate effective to achieve an average temperature rise rate at the filter inlet face of at least 125° C./minute, as achieved under the illustrated Fast Inlet condition for regeneration shown in the drawing, is an example of a suitable ramp rate for such a second regeneration step.

FIG. 1 of the drawings compares filter temperatures and soot combustion efficiencies for controlled and uncontrolled regenerations initiated by heated exhaust gas supplied to the filter inlet at selected temperatures over a 550-675° C. range. Reported for each of these two regeneration conditions at selected inlet temperatures over the plotted temperature range are the peak filter temperatures developed in the filters (Max. Temp. [° C.]), as well as the extent of soot removal (Regen. Eff. [%]) effected by the regeneration. Soot removal is reported as the percent of soot remaining after regeneration from the total soot load of 4 grams/liter of filter volume present at the start of each regeneration cycle. Evident from the data in FIG. 1 is the fact that, at higher inlet temperatures, controlled regenerations produce better regeneration efficiencies than uncontrolled. However, under these same conditions, uncontrolled regenerations produce much higher exothermic responses than controlled. This behavior is more pronounced under higher soot loads.

Figure 2:
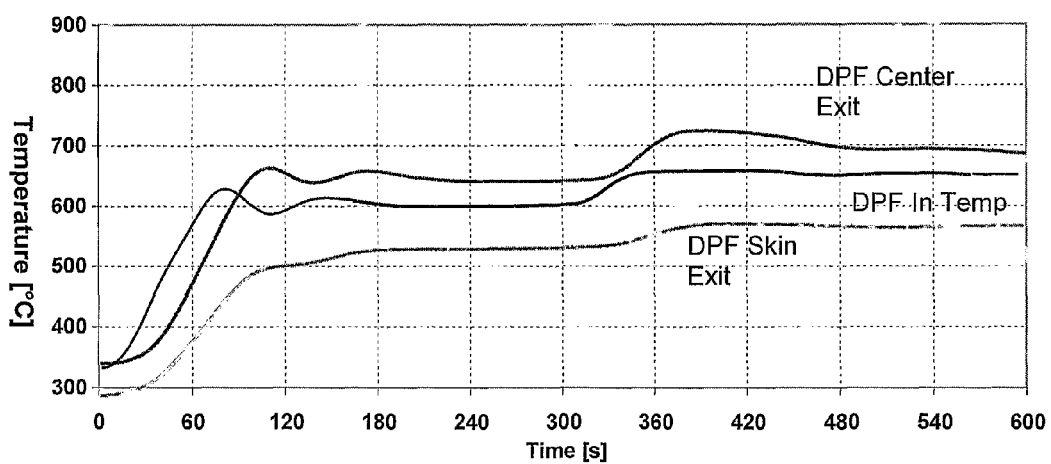
FIG. 2 is a graph plotting filter inlet and exit temperatures for a staged regeneration cycle.

With a stepwise or staged regeneration, high regeneration efficiencies can be combined with a low exothermic response, even during uncontrolled regeneration conditions. Using this method, combustion is initiated by staying at lower inlet temperatures for a certain period until a sufficient amount of soot has been oxidized to prevent a high exothermic response at higher inlet temperatures. FIG. 2 of the drawing illustrates a staged regeneration process for a filter containing 4 g/liter of combustible soot wherein, after the initial combustion period initiated by the introduction of a 600° C. gas to the filter inlet for 5 minutes, the gas inlet temperature is raised to 650° C. for an additional 5 minutes (DPF In Temp). The second stage heating is effective to completely remove residual soot from the filter. Under staged regeneration as shown in FIG. 2, the peak filter temperature reached during regeneration, observed at the center exit of the filter (DPF Center Exit), is less than 750° C., while filter temperatures near the periphery of the filter (DPF Skin Exit) reach only about 575° C.

A similar regeneration strategy can also be applied in a more continuous fashion using a ramped filter inlet temperature profile. In that case the rise to the initial soot combustion temperature can be relatively rapid, but subsequent temperature increases are applied at a controlled and slower rate to ensure that the inlet temperature versus soot load relationship is maintained at a safe level at all times. The term "safe level" is used to indicate an inlet temperature versus soot load relationship which will result in maximum exotherm temperatures and gradients in the part which do not result in part failure (loss of filtration efficiency).

Figure 3:
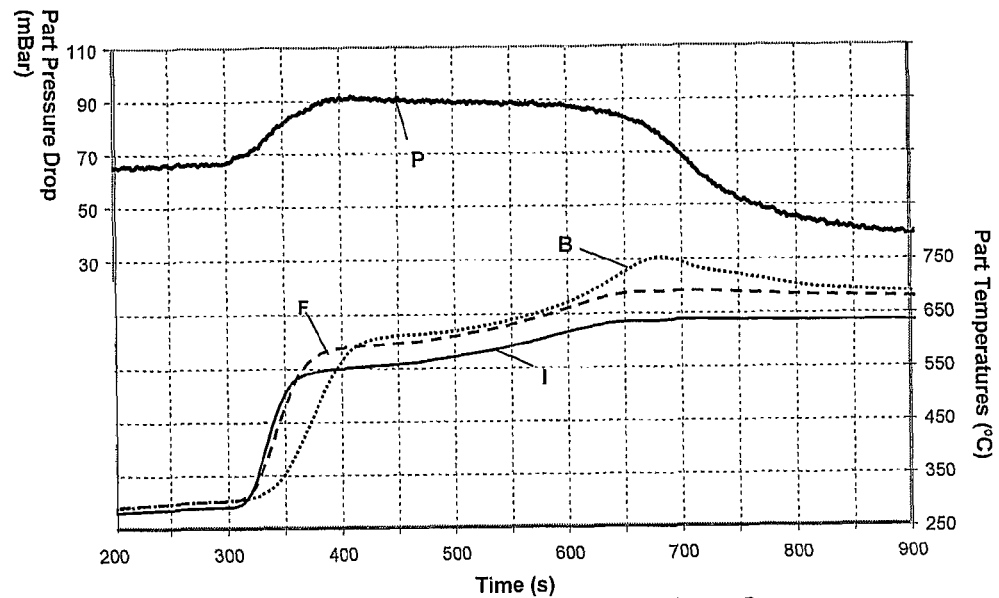
FIG. 3 is a graph plotting filter inlet and axial temperatures with pressure drop for a staged regeneration cycle.

A typical ramped regeneration process is graphically illustrated in FIG. 3 of the drawings. For comparison, a standard "fast" ramp regeneration is graphically illustrated in FIG. 4. Both regenerations are run at a filter soot loading of 8 g/liter of accumulated soot.

The process of FIG. 3 is initiated by increasing the filter inlet temperature (i) to 550° C. and then holding at that temperature for two minutes, thereafter further ramping the inlet temperature up to 650° C. over approximately a five-minute heating interval. The front end (F) and back end (B) temperatures of the filter begin to exceed the inlet temperature at the 550° C. hold with the initial combustion exotherm appearing at the front (F) of the filter, although the back (B) temperatures lead the front (F) temperatures over most of the remainder of the cycle. Advantageously, the back exotherm is moderate with part temperatures at the hotter rear of the filter not exceeding about 750° C. The progress of soot removal is generally indicated by the pressure drop plot P showing the pressure drop changes exhibited across the filter during the regeneration cycle.

Figure 4:
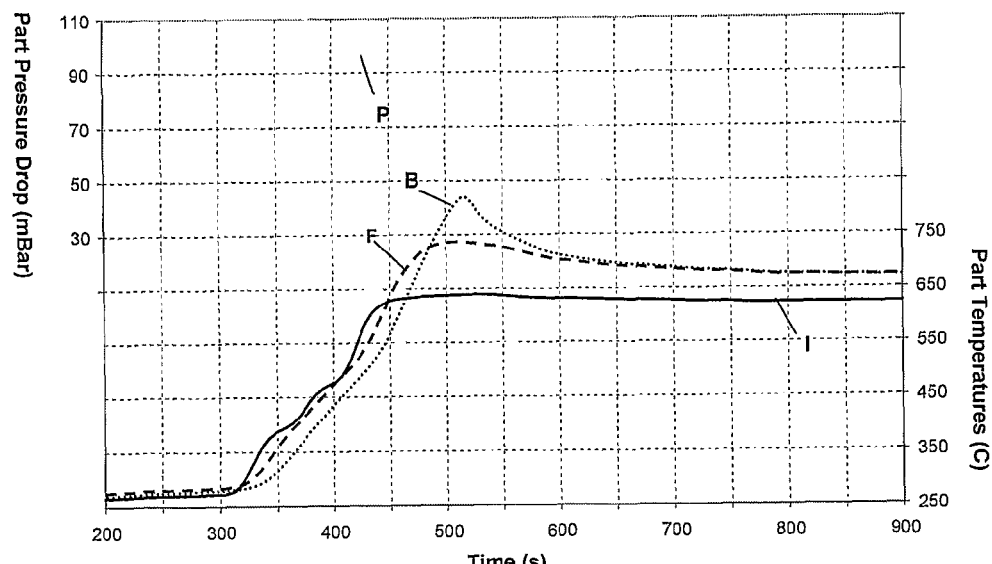
FIG. 4 is a graph plotting filter inlet and axial temperatures with pressure drop for a fast ramp regeneration cycle.

The conventional "Fast" ramp regeneration illustrated in FIG. 4 of the drawings involves raising the filter inlet temperature (plot I) to 650° C. over a relatively short heating interval, e.g., not exceeding about 120 seconds. Temperature plots for the regeneration temperatures measured at the front (F) and back (B) of the filter, as well as the resulting changes in filter pressure drop (plot P) during regeneration, are presented as in FIG. 3.

It is evident from FIGS. 3 and 4 that temperature increases within these filters during regeneration are highly dependant upon the inlet temperature history. In FIG. 4, the "fast" ramp condition exceeds soot combustion temperatures at the front of the filter first, which results in a cascading temperature field moving from front to back, causing a more severe exotherm. In FIG. 3, the "ramped" regeneration allows the temperatures in the back of the part to reach combustion temperatures at the same time or prior to the front, resulting in a diminished exotherm response. The soot combustion rate is also more uniform in the "ramped" case, as evidenced by the DPF pressure drop curves (P).

The DPF pressure drop curves seen in FIGS. 3 and 4 are proportional to the filter temperature and soot loading. As the filter temperature increases, and prior to soot combustion, these curves increase in value. As soot combustion temperatures are reached and soot begins to oxidize, these curves flatten out and begin to drop. As the temperature of the filter stabilizes, the ensuing changes in the pressure drop curves are proportional to soot combustion alone.

Referring again to FIG. 4, the conventional ramp produces a relatively short peak in the pressure drop curve, followed by a rapid drop-off, indicating a quick combustion rate, resulting in a sudden release of energy and high DPF temperatures and gradients. In FIG. 3, the filter pressure drop curve shows a gradual decline in pressure over time, indicating a much slower and more uniform soot combustion process. The resulting peak DPF temperatures and temperature gradients throughout the part are smaller as a result.

Figure 5:
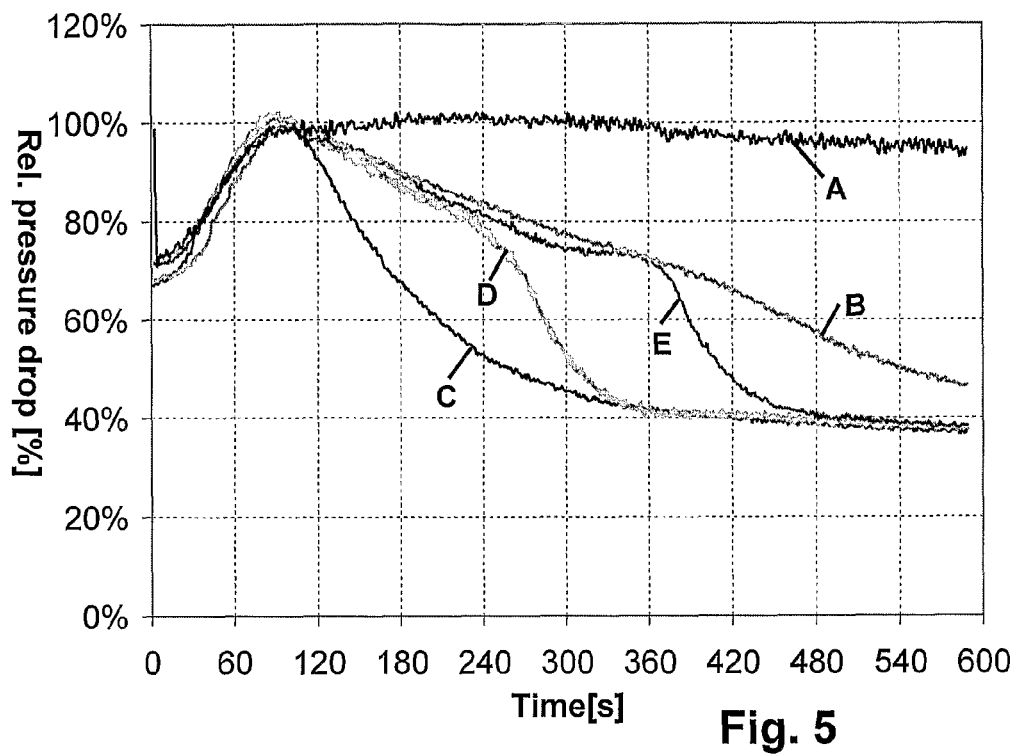
FIG. 5 is a graph plotting filter pressure drop through regeneration cycles initiated at various inlet temperatures.

The use of ramped heating regeneration cycles do not necessarily involve a penalty in the extent of soot removal that can be achieved over a given cycle time. FIG. 5 of the drawings, for example, illustrates the changes in filter pressure drop reflecting soot removal efficiencies that are observed in the course of the regeneration of a common catalyzed design at a soot loading of 4 g/liter using a variety of inlet temperature heatup conditions. The inlet heating conditions reported include fixed 550° C. (A), 600° C. (B), and 650° C. (C) inlet temperature conditions as well as two ramped regeneration cycles; cycle D with filter inlet heating at 600° C. for 3 minutes and then at 650° C. for 7 minutes, and cycle E with filter inlet heating for 5 minutes at 600° C. and 5 minutes at 650° C. All regeneration cycles are of the same 10-minute duration. As the data in FIG. 5 indicate, the ramped cycles provide regeneration efficiencies essentially equivalent to the efficiencies of conventional single step regeneration, as reflected by the final filter pressure drops, even though they generally produce lower peak regeneration temperatures in the filters.

Staged regeneration can provide a reduction in peak filter temperatures and temperature gradients during uncontrolled regenerations as well. An illustrative comparison is that between a filter undergoing an uncontrolled regeneration following cycle initiation at a fixed exhaust inlet temperature of 650° C. (fast ramp), and the same filter configuration undergoing an uncontrolled regeneration following cycle initiation at an initial exhaust gas inlet temperature of 600° C. for 5 minutes followed by a 5 minute period at 650° C. (staged initiation).

Figure 6:
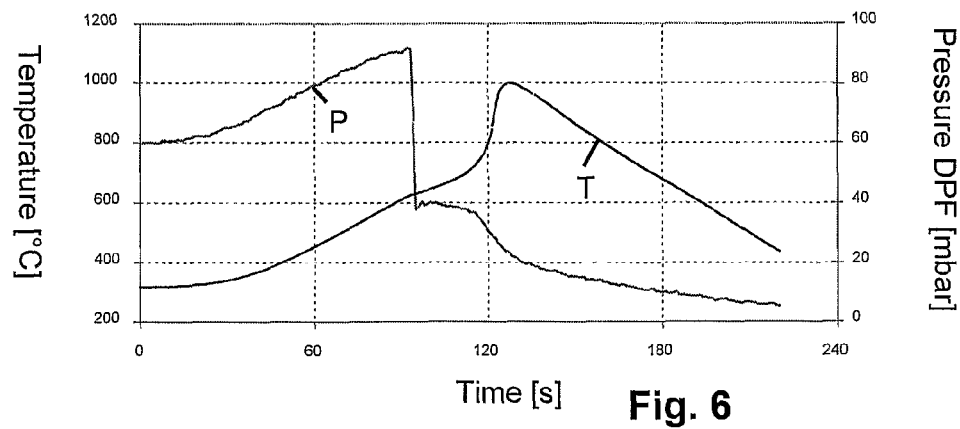
FIG. 6 is a graph plotting pressure drop and peak filter temperatures for a first uncontrolled regeneration cycle.
Figure 7:
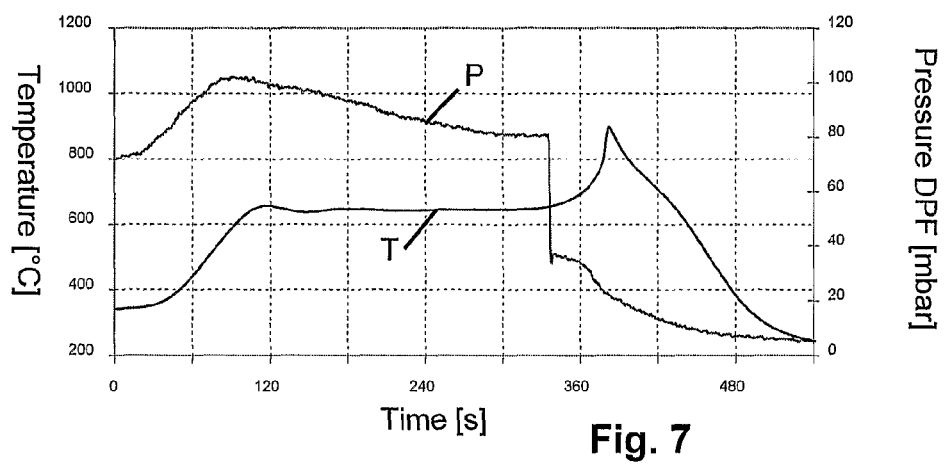
FIG. 7 is a graph plotting pressure drop and peak filter temperatures for a second uncontrolled regeneration cycle.

Data generated for two such cases are presented in FIGS. 6 (fast ramp case) and 7 (staged case) of the drawings. The filters regenerated are cordierite filters supporting 4 g/liter soot loadings. The filter pressure drops (P) plotted in the drawings reflect the sudden pressure drops characteristic of the drop-to-Idle (DTI) event, which occur at about 90 seconds in the fast ramp cycle (FIG. 6) and at about 330 seconds in the staged cycle (FIG. 7). As a comparison of the two rear axial temperature profiles (the plots labeled "T") suggest, the use of a preliminary regeneration preheat stage for 5 minutes at 600° C. to reduce the effective soot load to be removed by the final 650° C. inlet temperature phase, as in FIG. 7, results in a significant decrease (about 200° C.) in the peak temperatures when compared to the fast ramp case of FIG. 6.

The use of staged regeneration offers significant advantages for regenerating particulate filters used in heavy duty (HD) applications as well, although the filters for those applications tend to be much larger in order to handle the increased exhaust stream volumes of heavy duty use. In general, developing regeneration temperatures in these larger filters that are sufficient to efficiently combust accumulated soot requires more time and supplemental heating than are required for smaller light duty (LD) filters.

Using a conventional inlet exhaust inlet temperature hold, e.g., 600° C., for heavy duty filter regeneration can bring the axial filter temperature to regeneration temperatures quickly, but some uncontrolled release of heat develops as temperatures cascade towards the back of the filter. This release produces relatively high temperatures and large temperature gradients in the DPF.

A controlled ramp of the inlet, on the other hand, has the effect of burning soot more uniformly throughout the part at steadily increasing rates, thereby avoiding the uncontrolled release of energy and maintaining smaller temperature differentials between the inlet temperature and filter bed regeneration temperatures. An example of a suitable ramp rate is one wherein the inlet exhaust gas stream is heated gradually from 575° C. to about 650° C. over a heating interval of 10-15 minutes. Tight control of filter bed temperatures during heavy duty filter regeneration is particularly desirable for automotive-truck applications where the only available thermal feedback for system control will be inlet temperature sensors. Thus filter bed temperature data cannot be economically made available for regeneration control purposes.

An important advantage of staged regeneration for HD filter applications is it does not diminish the regeneration efficiency of the regeneration cycles. Ramped inlet temperatures for these applications appear to help bring the periphery of the filter up to combustion temperatures, allowing for increased uniformity of soot combustion during each cycle. In one efficiency test an improvement in regeneration efficiency from 77% for the conventional cycle initiated at 600° C. to 94% for the staged cycle was observed. It should be noted that conventional regeneration at fixed exhaust inlet temperatures of 650° C. are not favored for these larger filters, even at soot loadings of 4 g/l, since damage to the filter under these regeneration conditions can occur.

Fuel economy is also an important factor when considering regeneration strategies, and staged regenerations appear to offer fuel efficiency advantages over conventional regenerations as well. Representative test data comparing heavy duty filter regenerations employing fast ramp and staged regeneration cycles, with similar filter soot loadings of 7-8 g/liter and with filter exhaust inlet temperatures of approximately 650° C. being reached in both cases, are reported in Table 1 below. As the data suggest, the staged ramp regeneration run offers regeneration efficiency nearly identical to that of the fast ramp run, while achieving a lower maximum exothermic response, and at a 10% lower fuel consumption over the full regeneration cycle. This is attributed to the time spent at lower inlet temperatures, which is associated with lower fuel injection quantity, prior to ramping up to the maximum inlet temperature.

TABLE 1

Heavy Duty Filter Regeneration

| HD Regeneration Cycle | Staged Ramp | Fast Ramp |
|---|---|---|
| Soot Load | 7/8 g/l | 8.0 g/L |
| Max. Filter Inlet Temp (° C.) | 653.7° C. | 652.4° C. |
| Max. Filter Regen. Temp (° C.) | 753.5° C. | 980.2° C. |
| Regen. Efficiency | 80.2% | 79.7% |
| Cumulative Fuel Consumption | 1.037 kg | 1.149 kg |

In summary, tailoring the inlet temperature with time and dependent on the soot load level in the filter and other inlet conditions has been found to effectively mitigate the risk of potentially damaging uncontrolled energy releases during controlled as well as uncontrolled soot regeneration events, and across both HD and LD diesel particulate filter platforms. Further advantages of these staged regeneration strategies include generally superior regeneration process efficiency and control, improved fuel economy within regeneration cycles, and reduced oil dilution rates from post-ignition fuel injections since higher soot loadings are permissible and thus less frequent filter regeneration is required. Since more uniform soot regeneration over the entire volume of the filter is provided, ramping to higher inlet temperatures to provide improved peripheral heating and regeneration of the filter can safely be used. Regeneration uniformity improves the ability of engine controllers to predict soot loadings and to thereby avoid potentially damaging soot overload conditions.

The invention claimed is:

1. A method for regenerating a diesel particulate filter to remove trapped combustible particulate material therefrom by the step of raising the temperature of the material to a material ignition temperature, wherein heat is introduced into the filter at a heating rate below a filter-damaging threshold heating rate, wherein a first regeneration phase comprises a first heating ramp rate effective to maintain the average temperature rise rate at the filter inlet face below 100° C./minute, and a second regeneration phase comprises a heating ramp rate effective to achieve an average temperature rise rate at the filter inlet face of at least 125° C./minute.

2. A method in accordance with claim 1 wherein the heating rate is a staged heating rate comprising the steps of:

in the first regeneration phase, raising the temperature of the filter or the particulates into an initial regeneration temperature range bounded by an upper temperature limit to initiate combustion of trapped particulates, and in the second regeneration phase, after initiation of such combustion, adding additional heat energy to the filter sufficient to raise the temperature of the filter above the upper temperature limit to promote the further combustion of trapped particulates.

3. A method in accordance with claim 2 wherein the upper temperature limit is a temperature at or below which the combustion of trapped particulates within the filter is incomplete.

4. A method in accordance with claim 2 wherein the upper temperature limit is a temperature at or below which exotherms from the combustion of trapped particulates are insufficient to raise the temperature of the filter above a filter melting temperature.

5. A method in accordance with claim 2 wherein the upper temperature limit is a temperature at or below which exotherms from the combustion of trapped particulates are insufficient to raise the temperature of the filter above 1000° C.

* * * * *